US012325823B2

(12) United States Patent
Vasshus et al.

(10) Patent No.: US 12,325,823 B2
(45) Date of Patent: Jun. 10, 2025

(54) COMPOSITION FOR MAKING A DRILLING FLUID A NON-INVASIVE DRILLING FLUID

(71) Applicant: European Mud Company AS, Stavanger (NO)

(72) Inventors: Jan Kristian Vasshus, Sandnes (NO); Karl Ronny Klungtvedt, Sandnes (NO); Swapan Kumar Mandal, Balcatta (AU)

(73) Assignee: European Mud Company AS, Stavanger (NO)

( * ) Notice: Subject to any disclaimer, the term of this patent is extended or adjusted under 35 U.S.C. 154(b) by 0 days.

(21) Appl. No.: 18/403,777

(22) Filed: Jan. 4, 2024

(65) Prior Publication Data

US 2024/0141224 A1 May 2, 2024

Related U.S. Application Data

(62) Division of application No. 17/432,423, filed as application No. PCT/NO2020/050069 on Mar. 13, 2020, now Pat. No. 11,912,928.

(30) Foreign Application Priority Data

Mar. 13, 2019 (NO) .................................... 20190335
Dec. 10, 2019 (NO) .................................... 20191461

(51) Int. Cl.
| C09K 8/035 | (2006.01) |
| C09K 8/514 | (2006.01) |
| C09K 8/516 | (2006.01) |

(52) U.S. Cl.
CPC .............. C09K 8/516 (2013.01); C09K 8/035 (2013.01); C09K 8/514 (2013.01); C09K 2208/04 (2013.01)

(58) Field of Classification Search
CPC ........ C09K 8/035; C09K 8/514; C09K 8/516; C09K 2208/04
See application file for complete search history.

(56) References Cited

U.S. PATENT DOCUMENTS

| 2,799,647 A | 7/1957 | Borcherdt |
| 4,246,037 A | 1/1981 | Cottrell |
(Continued)

FOREIGN PATENT DOCUMENTS

| CA | 652854 A | 11/1962 |
| CN | 102220111 A | 10/2011 |
(Continued)

OTHER PUBLICATIONS

Wood, "Panel and Structural Timber Products-Mechanical Properties" by The Engineering Toolbox (https://www.engineeringtoolbox.com/timber-mechanical-properties-d_1789.html), 2023.

(Continued)

*Primary Examiner* — Aiqun Li
(74) *Attorney, Agent, or Firm* — Andrus Intellectual Property Law, LLP (57) ABSTRACT

A composition is for making a drilling fluid a non-invasive drilling fluid. The composition has a first component comprising particles having a scratch hardness above 2 Mohs and a second component comprising particles selected from the group of fragmented seeds of *Tamarindus indica*, comminuted bark from *Litsea glutinosa*, or comminuted *Ocimum tenuiflorum*. Also disclosed is a non-invasive drilling fluid having the composition, and a method for drilling a wellbore.

19 Claims, 2 Drawing Sheets

(56) References Cited

U.S. PATENT DOCUMENTS

| | | | |
|---|---|---|---|
| 5,071,575 A | 12/1991 | House | |
| 5,076,944 A | 12/1991 | Cowan | |
| 5,229,018 A | 7/1993 | Forrest | |
| 5,421,412 A | 6/1995 | Kelly | |
| 5,763,367 A | 6/1998 | Burts, Jr. | |
| 5,801,127 A | 9/1998 | Duhon, Sr. | |
| 5,861,362 A | 1/1999 | Mayeux | |
| 6,016,879 A | 1/2000 | Burts, Jr. | |
| 6,399,545 B1 | 6/2002 | Rose | |
| 8,733,443 B2 * | 5/2014 | Al-Taq | E21B 37/00 166/372 |
| 10,017,679 B1 | 7/2018 | Luo | |
| 2003/0236171 A1 * | 12/2003 | Nguyen | C09K 8/08 507/100 |
| 2006/0234886 A1 | 10/2006 | Massaro | |
| 2010/0243236 A1 | 9/2010 | Koons | |
| 2015/0060072 A1 | 3/2015 | Busby | |
| 2016/0137903 A1 * | 5/2016 | Friedheim | C09K 8/502 507/104 |
| 2016/0298017 A1 | 10/2016 | Takahashi | |
| 2018/0066172 A1 | 3/2018 | Vigano | |
| 2018/0171200 A1 | 6/2018 | Amanullah | |
| 2018/0171202 A1 | 6/2018 | Amanullah | |
| 2018/0305609 A1 * | 10/2018 | Hall | C09K 8/60 |
| 2018/0340110 A1 | 11/2018 | Amanullah | |

FOREIGN PATENT DOCUMENTS

| | | |
|---|---|---|
| CN | 107035338 A | 8/2017 |
| CN | 107880862 A | 4/2018 |
| CN | 108865088 A | 11/2018 |
| EP | 0021699 A1 | 1/1981 |
| EP | 0975708 A1 | 2/2000 |
| EP | 1091086 A1 | 4/2001 |
| WO | 03031478 A1 | 4/2003 |
| WO | 2012037600 A1 | 3/2012 |
| WO | 2016019416 A1 | 2/2016 |
| WO | 2019090761 A1 | 5/2019 |

OTHER PUBLICATIONS

Shi Jiangang et al., "Protection Technology of Oil and Gas Reservoirs in Shengli Oilfield", China University of Petroleum Press, Dec. 31, 2009, pp. 177-178.

Kennedy, J.F., Book Review of SONI, P.L. et al., "Trends in Carbohydrate Chemistry", 179 pages, 2000. Book Review published in Carbohydrate Polymers, vol. 45, Jul. 2001, p. 307.

Y. Saideswara Rao et al., "Tamarind (*Tamarindus indica* L.) research—a review" published Jan. 1999, pp. 512-533.

Indian Standard IS: 189-1977, "Specification for Tamarind Kernel Powder for use in Cotton and Jute Textile Industries", second reprint Sep. 1995.

Karl Ronny Klungtvedt et al., "Managing High Differential Pressures in Fractured Carbonate Reservoir byUse of Wellbore Strengthening Material" OTC-32173-MS, presented at the Offshore Technology Conference held in Houston, TX, USA, May 1-4, 2023.

Norwegian Search Report for No. 20190335, dated Jun. 21, 2019.

Norwegian Search Report for No. 20191461, dated Jul. 6, 2020.

International Search Report and the Written Opinion for PCT/NO2020/050069, dated Jul. 6, 2020.

Response to the Written Opinion for PCT/NO2020/050069, dated Oct. 30, 2020.

Mahto et al. Rheological study of water based oil well drilling fluid. Journal of Petroleum Science and Engineering 45 (2004) 123-128.

Khoja et al. Scope for the use of Tamarind Kernel Powder as a Thickener in Textile Printing. Man-made textiles in India. Oct. 2001. 403-407.

* cited by examiner

COMPOSITION FOR MAKING A DRILLING FLUID A NON-INVASIVE DRILLING FLUID

CROSS-REFERENCE TO RELATED APPLICATIONS

This application is a divisional of U.S. application Ser. No. 17/432,423, filed Aug. 19, 2021, which is the U.S. national stage application of International Application PCT/NO2020/050069, filed Mar. 13, 2020, which international application was published on Sep. 17, 2020, as International Publication WO 2020/185093 in the English language. The International Application claims priority of Norwegian Patent Application Nos. 20190335, filed Mar. 13, 2019 and 20191461, filed Dec. 10, 2019. The above-referenced U.S. '423 application, the international application, and Norwegian applications are all incorporated herein by reference, in entirety.

FIELD

The invention relates to a composition for making a drilling fluid a non-invasive drilling fluid, to a non-invasive drilling fluid comprising the composition, and to a method for drilling a wellbore.

BACKGROUND

Drilling fluids (or "muds") used in the drilling of subterranean oil and gas wells, geothermal wells, mining, and other drilling applications are well known. Drilling fluids carry cuttings and other particulates from beneath the bit, transport them through the annulus, and allow their separation at the surface, while at the same time the rotary bit is cooled and cleaned. A drilling fluid is also intended to reduce friction between the drill string and the sides of the hole while maintaining the stability of uncased sections of the borehole. The drilling fluid is formulated to prevent unwanted influxes of formation fluids from permeable rocks penetrated. The drilling fluid may also be used to collect and interpret information available from drill cuttings, cores and electrical logs. It will be appreciated that as used herein, the term "drilling fluid" also encompasses "drill-in fluids" and "completion fluids".

In the oil and gas industry, drilling of deep wells is subject to a range of challenges, for example bore hole instability, stuck pipe, lost circulation, high torque and drag, sloughing and caving, bit balling and formation damage. Specially designed drilling fluids are used to overcome most of these issues. The main roles of these drilling fluids are to clean the hole (by removing the cuttings), seal the permeable formation (forming a filter cake on borehole surface), cool and lubricate the bottom hole assembly (BHA) and drill bit, increase the rate of penetration, maintain well bore stability, and minimise reservoir formation damage.

One of the causes for well bore instability is the presence of microfractures on the borehole surface. If the hydrostatic pressure of the drilling fluid is higher than the formation pressure, the drilling fluid may penetrate through this microfracture and increase the pressure therein, also known as pore pressure transmission. Due to this pressure transmission the differential pressure between the fluid hydrostatic pressure and the formation pressure, which resulting differential force supports the sidewall by pushing towards the formation, will decrease, whereby the hydrostatic differential pressure will provide less support for the sidewall. This may lead to hole instability.

Another common problem encountered during drilling operations include fluid loss and/or seepage loss. The term "fluid loss" will in this disclosure be used to refer to the more significant loss of drilling fluid that often occurs where porosities and microfractures are significant. The term "seepage loss" will in this disclosure be used to refer to the less significant loss of the drilling fluid in the zones of lesser porosities and fracture sizes. Fluid loss and seepage loss occur when the liquid fraction from the drilling fluid seeps into the surrounding formation, leaving the solid particulate portions of the drilling fluid in the well bore. Fluid loss and seepage loss can occur to any type of formation when the size of the particles in the well fluid is smaller than the size of the pore openings of a formation. This loss occurs as a result of the actual filtration of the solids by the formation due to a differential pressure from the fluid column to the formation.

For controlling seepage loss of drilling fluids to formation under low to moderate differential pressures, typically tested up to 500 psi, and in low to moderate permeabilities, different methods are used for oil-based drilling fluids and water-based drilling fluids. This may typically be called filtration loss control and may be tested at 100 psi or 500 psi differential pressure in a standard API cell and high temperature and high pressure (HTHP) filter cell. For oil-based drilling fluids, additives such as gilsonite, asphalts, amine-treated lignite, or organophilic clays are commonly used to improve filtrate loss control. For water-based drilling fluids a range of polymers such as polyanionic cellulose (PAC) and starch are additives to improve fluids loss control. The used polymers are typically water-soluble.

A non-invasive drilling fluid (NIF), in contrast, normally contains additives that are mostly dispersed rather than dissolved in the fluid. The NIF additives enable sealing of formations with higher permeability as well as fractured formations and under higher pressures where conventional fluid loss control fails to seal the wellbore effectively. A non-invasive fluid is a drilling fluid which seals the pores or microfractures quickly after being invaded, thus reducing the chances of well bore instability. Formation damage is also prevented in production zones using the same action by providing a physical barrier, thereby isolating the production zone from the fluid column and reducing damage.

In the context of this application, a non-invasive fluid is considered a fluid that can pass either of the following tests:
- an API HTHP (30 minutes, 500 psi at 90° C.) test with less than 40 ml of fluid filtrate when using a ceramic disc with mean pore-throat of 50 µm and permeability of 15 Darcy (such as the Ofite #170-53);
- an API HTHP (30 minutes, 500 psi at 90° C.) test with less than 20 ml of fluid filtrate when using a ceramic disc with mean pore-throat of 20 µm and permeability of 3 Darcy (such as the Ofite #170-53-3); or
- a 100 psi differential pressure sand-bed test over 10 minutes at 25° C. temperature and with sand sized between 30 mesh (circa 595 µm) and 40 mesh (circa 400 µm) with less than 45 mm invasion.

The prior art is replete with many disclosures of cementing in wells penetrating subterranean formations. In such operations, drilling fluids, often referred to as "muds", are normally present in oil and other similar wells at the time of cementing a casing into a borehole with an aqueous cement slurry. Since the mud and cement are not always compatible with each other, it may be desirable to separate or prevent contact between them by use of a non-invasive drilling fluid system. Without the use of such non-invasive drilling fluid, the incompatibility of the aqueous slurry with the oil-based mud may be of such severity that a mixture of the two forms an un-pumpable substance. Such un-pumpable substance may prevent displacement of at least a portion of the drilling fluid. Non-invasive drilling fluid also serve to water-wet the wellbore surfaces to promote bonding of the cement sheath to the wellbore and casing.

Prior art fluids are designed to be turbulent spacer fluids at low shear rates allowing them to displace viscous drilling mud from the wellbore. Some turbulent fluids have certain drawbacks, for example, instability under operating conditions, especially at the higher temperatures which are possible at the bottom of a wellbore. In the case of separating drilling fluids, such mixing and remixing may result in reduced segregation performance, drilling mud contamination to the leading edge of the cement or cement slurry, limited capability to move drilling muds in the wellbore, and low sweep efficiencies of water-based muds. Usually these disadvantages adversely affect the quality of the cementing operation in the drill hole. For example, by failing to adequately remove the drilling fluid, the performance of the set cement slurry may be compromised with respect to its ability to bond to both the exposed rock surface in the drilled wellbore and to the tubulars placed in the wellbore.

Invasion of mud filtrate can be reduced by forming a low-permeable thin barrier on the borehole walls or plugging pores or microfractures in the borehole walls. Traditionally, this has been done successfully by using pore-sealing agents such as latex, asphalt, aluminium polyhydroxide, or sodium/potassium silicate precipitation mechanism, or by formation of soft compressible cellulose particles barrier on the borehole surface.

Although some solids invasion and formation damage are inherent to all drilling fluids, it is possible to minimize the damage caused by solids invasion, and the depth of this damage, by correctly sizing the bridging particles in drilling fluids. The drilling fluids which restrict the invasion depth within a few mm, or do not allow any further invasion of mud into the formation, are known as non-invasive fluids (NIF) or ultra-low invasion fluids (ULIF).

A NIF typically comprises a mixture of particles carefully sized to seal fractures of a given size or range of sizes. The components are typically sized solid particles or sized polymeric materials, such as cellulose-based fibres, which form a non-permeable membrane. It has been observed in the past that during conventional drilling process when NIF components addition is programmed for invasion control, it is being added to the old drilling fluid. This NIF component is known to have used the ultrafine drill solids particles and active colloidal clay (also known as MBT) generated in the drilling process to assist in forming a final tight seal on the membrane. The ultrafine drill solids and active clays are claimed to have been used to form the thin membrane that limits the fine migration and reservoir impairment. During this process, some fine migration of ultrafine solids may take place in the reservoir pores which will plug the pores partially and reduce production undesirably.

US20100243236 patent application discloses nanoparticle-densified Newtonian fluids for use as cementation spacer fluids and completion spacer fluids in oil and gas wells.

Many different types of organic materials have been used to address seepage loss.

U.S. Pat. No. 6,399,545 discloses the problem of seepage loss or fluid loss include describes the use of fruit pomace in drilling fluid additives.

U.S. Pat. No. 5,071,575 describes using ground oat hulls in a limited particle size range, with the addition of one or more agricultural by-products such as ground citrus pulp to decrease seepage loss.

U.S. Pat. No. 5,229,018 teaches the use of peanut hulls as an additive.

U.S. Pat. No. 5,076,944 discloses the use of cotton burs in combination with one or more of ground oat hulls, ground corn cobs, hydrophobic organophilic water-wettable cotton, ground citrus pulp, ground rice hulls, ground nut shells, and mixtures thereof as a seepage loss additive.

U.S. Pat. No. 5,801,127 discloses the use of ground olive pulp as an additive to prevent fluid loss in both water-based and oil-based drilling fluid.

While organic additives are often less expensive than inorganic additives, and are usually environmentally safe, not all organic additives can provide a sufficiently broad particle size distribution to prevent seepage loss or fluid loss over a broad range of drilling conditions. Some additives are useful as lost circulation additives, while proving ineffective for fluid or seepage loss. Furthermore, some additives affect the permeability of the surrounding formation. Also, some organics tend to form sticky agglomerations (mud balls) that diminish bit penetration significantly. Frequently these sticky accumulations form mud rings as the fluid attempts to carry them up the bore wall.

As every drilling operation is different, there is still a need for a drilling fluid additive that will address fluid loss and/or seepage loss in various drilling conditions, that will be compatible with a water-based or oil-based drilling fluid, and that will not have detrimental effects on the flow properties of a surrounding subterranean formation. In particular, the challenge of fluid loss, well control, and formation damage is important as one drills into a hydrocarbon reservoir where the pressure in the formation fluid has been reduced as a consequence of production from the reservoir. During the drilling of wells, situations occur where the differential pressure between the drilling fluid in the well and the fluid in the formation reaches several thousand psi or several hundred bar. In many cases, prior art NIF does not have the strength to seal of pore throats and/or fractures under such high-pressure conditions, thereby inducing pressure transmission and fluid loss. There is also a need for such an additive which will not adversely affect the lubricative properties of the well fluid. Accordingly, there remains a need in the art for improved non-invasive drilling fluid that overcome aforementioned drawbacks. A need also remains for a non-invasive drilling fluid that can effectively remove particulate such as drilling muds, as well as liquid contaminant particles. There is also a demand to be able to remove the barrier cake before production, to clean the formation and enable optimum production of the well.

SUMMARY

The invention has for its object to remedy or to reduce at least one of the drawbacks of the prior art, or at least provide a useful alternative to prior art. The object is achieved through features, which are specified in the description below and in the claims that follow. The invention is defined by the independent patent claims while the dependent claims define advantageous embodiments of the invention.

In a first aspect, the invention relates to a composition for making a drilling fluid a non-invasive drilling fluid, the composition comprising: a first component comprising particles having a scratch hardness above 2 Mohs; and a second component comprising particles selected from the group of comminuted seeds of *Tamarindus indica,* comminuted bark from *Litsea glutinosa,* or comminuted *Ocimum tenuiflorum.* *Tamarindus indica* is also known as and referred to herein as tamarind seed, bark from *Litsea glutinosa* is also known as and referred to herein as jiggat, and *Ocimum tenuiflorum* is also known as *Ocimum sanctum,* holy basil, tulasi, and tulsi, and is referred to herein as tulsi. The particles may be prepared by e.g. grinding or crushing.

A scratch hardness of 2 on Mohs hardness scale may correspond to a hardness of around 61 kg/mm$^2$ on Vickers hardness scale. Mohs scratch hardness is a standard practical approach known to a skilled person within the field. In brief, to determine the scratch hardness of an unknown material, it is scratched against different other materials which have a known scratch hardness. If the unknown material in questions becomes dented, it has a lower scratch hardness than the other material. Otherwise, if the other material becomes dented, the unknown material has a higher scratch hardness than the other material. This may be repeated with several other materials to determine the scratch hardness with a desired precision. As an example, walnut shell or almond shell typically has a scratch hardness in the range of 3-4 Mohs, while calcium carbonate has a hardness of 3 Mohs (calcite) and is considered a soft mineral. The hardness reference for 2 Mohs is gypsum ($CaSO_4.2H_2O$). Therefore, when a particle of the first component is scratched against gypsum, gypsum will be dented rather than the particle of the first component. The hardness of the first component may typically be below 8.5 Mohs, since higher hardness values may cause the particles of the first component to have a poorer contact with other particles.

The composition may typically be in the form of an additive for being added to a fluid such as a drilling fluid. If the composition is mixed into a fluid, for example a liquid, and pressure is applied to the fluid to attempt to press it through a porous or permeable material, the components of the composition form a thin impermeable film or membrane covering the porous openings of the material. This is basically the situation in a well during drilling, wherein the formation is porous or permeable, and a drilling fluid is pumped into the well for the reasons described above. By using this composition in a drilling fluid during drilling of a well, the drilling fluid will be a non-invasive drilling fluid. The pressure applied to the fluid will cause an impermeable film to be formed on the surfaces of the porous or permeable portions of the well, whereby substantially no fluid is lost into the formation after the film has been formed. Thereby, instead of blocking the microfractures of the formation with particles into said microfractures as prior art is teaching, the film resulting from the present invention will cover the opening portion of the microfractures and be held in place by the pressure applied to the drilling fluid. The composition will therefore be especially useful in a drill-in fluid for drilling of a production zone, where it is important that the pores or microfractures are not permanently plugged. Thus, after the drilling of the well is finished and the pressure to the drilling fluid is removed, the pressure in the formation in the production zone will be greater than the pressure in the well, whereby the film may be automatically lifted off and removed. There is therefore generally no need for any additional treatment step to remove the film, for example using acid. However, an additional treatment step may still be used if desired. For example, most of the film may be solubilized using NaOCl, optionally followed by HCl if the desired degree of solubilization is not reached. The solubility of the film made by the composition in 5 wt % NaOCl and followed by 16 wt % HCl generally exceeds 90 wt %. This may be used to solubilize the film within the well. Use of the composition in a drill-in drilling fluid may therefore result in reduced formation damage and increased return permeability, and thereby increased production, of the well. While drilling the production zone, the operator may dump all the drilling fluids which may be laden with dirty mud, and then replace it with a fresh non-damaging and non-invasive drill-in fluid, as most conventional mud systems have poor return permeability.

The composition according to the invention has been observed to provide a film which can withstand higher pressure than prior art NIFs. The mechanism of the film formation is believed to be that the first and second components interlock, wherein particles of the first component function as bridging agents which provides strength to the film, whereas particles of the second component function to link the particles of the first component together. The particles of the second component has been observed to provide an adhesive effect which is greater than what is known from prior art. This effect is believed to be due to the specific types and distribution of biological molecules in the particles of the second component. The type and distribution of macromolecules may be different in within the group, so the mechanism may be slightly different. However, all particles of the second component have been shown to provide a film with good properties when mixed into water and subjected to increased pressure. It is believed that this increased pressure, e.g. downhole in a well, causes the particles of the second component to deform, whereby the contact area and frictional forces between the particles of the first and second component may increase. The film may even become more fluid-tight and stronger when the pressure is increased.

The adhesive effect of the particles of the second component will cause the particles to stick together more easily and form a strong yet flexible film. It has been observed that the adhesive properties are increased with increasing temperature, especially when the temperature reached around 55° C. This increase in adhesiveness may be referred to as activation of the components, which may for example be done by raising temperature to e.g. above 55° C. in the fluid they are suspended in. In addition to temperature, the time that the particles are within the fluid is also an important factor for the activation of the components. This is because the adhesive effect of the particles of the second component is typically obtained after hydration of the particles. A longer time period in a drilling fluid increases the adhesive properties until a maximum adhesiveness is reached. The adhesive effect may be in the form of mucoadhesive, gum, gelling, or film-forming properties. Additionally, an increase in pressure is needed for the film to form. Therefore, for a specific composition of drilling fluid, temperature, hydration time, and pressure may be varied to obtain the optimum parameters for a specific well. Additionally, the first, second, and any further component may be varied based on specific properties such as compressibility, flexibility, degree of solubility, micro sealing efficiency, and adhesiveness, in order to optimise the drilling fluid for a specific situation. The adhesive effect may be caused by phytochemical constituents in the second component, where more than 20% of the components may be protein, acids, oil, or non-fibre carbohydrates that are either insoluble in water or have low solubility in water. The adhesive effect is typically observed in a hydrated state of the second component and not in a dry state.

The composition may be applied in a drilling fluid in concentrations of 4-10 pounds per barrel (ppb) for preventative treatment of losses of drilling fluid against a permeable formation or a fractured formation in order to transform the drilling fluid into a non-invasive fluid. 1 ppb is 2.85 kg/m³, so 4-10 ppb corresponds to 11.4-28.5 kg/m³. Alternatively, the composition may also be applied in concentrations up to 30 ppb, corresponding to 85.5 kg/m³, as a pill or as sweep to seal losses after occurring. By keeping the concentration below 30 ppb in the drilling fluid, the particles of the composition will substantially stay dispersed without precipitating and risking blocking parts of the equipment. Then, after a differential pressure is applied, a film is formed across the microfractures. Since the particles of the composition form a film in the well during drilling, it may typically be necessary to add more of the composition while drilling to maintain the concentration of the composition and thereby the film-forming properties of the drilling fluid.

The composition according to the invention may therefore have film-forming properties when dispersed in a solution such as a drilling fluid, and especially when subject to increased pressure and temperature. No additional solids are required to be present in the drilling fluid for it to be converted into a non-invasive drilling fluid by use of the composition, and the drilling fluid may therefore also be a solids-free drilling fluid. A solids-free drilling fluid is in this discussion per definition a drilling fluid which does not use particles as weighting material, such as e.g. barite, hematite, calcium carbonate, or where solids which during the drilling operation become a part of the drilling fluid, such as fine drill-cuttings and clays, are not required to prevent leakage of the drilling fluid. However, the presence of any solids in the drilling fluid will not impede or decrease the film-forming properties of the fluid containing the composition. In some cases, casing strings can be avoided, as the non-invasive drilling fluid can withstand differential pressures in excess of 4000 psi. This will result in significantly lower well costs. The presence of solids in a drilling fluid, such as weighting materials or fine drill-cuttings, may enter into the formation and may reduce the permeability and thereby the ability of the formation to transfer fluids as intended during an operational phase. Such a type of drilling-fluid induced formation damage may significantly reduce the subsequent production, or injectability, and thereby the value of the well. The present invention may serve to efficiently create a temporary seal on the wellbore wall, thereby reducing drilling fluid-induced formation damage and better retaining the formation permeability and the value of the well. The temporary sealing film created by the present invention may be removed by either a reverse pressure, the application of a breaker solution, and/or the application of an acid. Depending on the application, the sealing film may also be in place permanently if removal is not desirable, such as e.g. as a foundation for cementing.

The composition may additionally comprise a third component having anisotropic mechanical properties or shape and a modulus of elasticity which is greater than 2000 MPa and less than 40000 MPa, at least in the longitudinal direction, El. The anisotropic mechanical properties of the third component will facilitate elastic deformation, whereby these particles will strengthen the film formed by the particles of the first and second component and contribute to the seal. The effect of the third component will therefore be to make the film even more flexible to differential pressure, such that the film may be able to withstand an even higher pressure without breaking. Examples of third components may be Western White Pine, *Pinus monticola,* which typically has a modulus of elasticity which is in the region of 8600 MPa in the longitudinal direction, or *Populus tremula,* which has a modulus of elasticity in the region of 8000 MPa.

The particles of the second component are all biodegradable, and the first and third components may advantageously also be biodegradable or biogenic, whereby the composition will not pollute the surroundings. The components may for example comprise plant parts such as plant fibres. The plant fibres may be biopolymers, for example polysaccharides. For example, the first and third components may comprise cellulose, as the molecular structure of cellulose fibres may provide some of the beneficial properties described above. Additionally, cellulose is biodegradable, and materials comprising cellulose may be easily obtained, for example as waste products from food production. The majority of at least one of the first and components may be cellulose for especially beneficial mechanical properties.

The first, second, and third component may be able to be exposed to temperatures up to at least 150° C. without losing the capability to create a pressure-resistant film, and for some combinations up to 200° C. without losing the capability to create a pressure-resistant film. The particles will thereby be especially suitable for use in a drilling fluid as the temperature in a well may be very high.

Formation of a film instead of blocking of the individual microfractures also decreases the problem that the bridging particles of prior art non-invasive fluids are required to have a size distribution which complements the size distribution of the fractures, as the film will be formed across microfractures of a broader size distribution. Therefore, less knowledge of the microfractures is required during drilling For example, particles may follow a bell-shaped or normal size distribution where the particles, or e.g. at least 90% of the particles, may pass through a sieve with 60mesh screen, i.e openings of 250 μm by 250 μm, while the particles, or at least 90% of the particles, will not pass through a sieve with 450 mesh screen, i.e. opening of 32 μm by 32 μm. This particle size range will be suitable for forming a film across microfractures with a typical size, but other particles size ranges may be applicable for other sizes of microfractures. In this application, when referring to e.g. a size of maximum 250 μm, this will mean that the particles may typically pass through a screen with openings of 250 μm by 250 μm. The size distribution of the particles may for example be selected so that 90% are maximum 180 μm (i.e. can pass through a sieve with 80 mesh screen). An advantage of this is that the particles will then go through an 80 mesh screen typically used in the solids control system during drilling and will thereby be kept in the active system rather than being screened out. The particles may also have a maximum of maximum 150 μm. The particles may have a suitable size distribution, for example where around 75% of the particles are smaller than 150 μm in size but above 20 μm, while 5% are smaller than 20 μm. In this way the smaller particles will form a fine sealing, while the presence of around 20% larger particles will contribute to the formation of a film across larger fractures. If the fractures are larger, a size distribution of larger particles may be chosen. If a relatively broad size distribution of particles in the composition is used, the film will more easily adapt to create networks for sealing of fractures or pore throats and connect particles and formation with different sizes and shapes. Most particle preparation methods, for example grinding of the components, will naturally result in a broad particles size distribution. The preparation of the composition is therefore simple.

The combined specific gravity of the mixture containing the first, second, and third component may be in the range of 0.7 to 1.1. Such a combined low specific gravity may facilitate application in a drilling fluid without increasing the specific gravity of the fluid, and hence avoid creating an increased hydrostatic pressure in the wellbore. In combination with the function of such a drilling fluid as wellbore strengthening material, the low specific gravity of the components may facilitate extended reach drilling and drilling of formations which are not possible using prior art technology.

The advantageous adhesive effect provided by the particles of the second component may likely be due to a significant presence of specific extractives such as terpenes, resin acids, fatty acids, amino acid polymers, oils, lignin, tannins, phenolics, and/or non-starch polysaccharides. For example, tamarind seed may typically contain a high concentration of material which may be described as natural polymers, natural gums, Tamarind Seed Polysaccharide (TSP), non-fibre carbohydrates, non-starch polysaccharide, uronic acid, and/or hexose sugar. In combination with water, this may create effects of swelling, gelling, thickening, or act as a binder. Apart from the hydrogen bond interaction typically present between soluble low molecular weight sugar and starch, the presence of one or more of the above extractives in combination with cellulose, which will also be comprises within the particles of the second component, may likely induce covalent bonds such as glycosidic linkages and/or amide/peptide bonds in protein molecules. This effect may increase under exposure to elevated temperatures. Such molecular bonds may be stronger than the hydrogen bonds created between cellulose particles through dehydration of hydrated cellulose. The hydrophobicity created due to presence of organic molecules of lower Hydrophilic-Lipophilic Balance (HLB) value prevents the extractives from being water soluble. Due to their partial solubility in water, these extractives remain coated on the cellulose surface and plays role in attaching the cellulose particles. An increased bonding between different cellulose particles via the above-mentioned extractives may therefore contribute to the advantageous properties of the film formed by the composition. The presence of organic acids and low molecular weight sugars are known to create stickiness in foods, whereas cellulose-based polysaccharide does not contribute significantly towards stickiness. Adhesion may also be present through xyloglucan chains which adhere to cellulose particles or which create a film on particles.

By adjusting the composition and concentration of the components in a fluid, it is also possible to create a viscosifier different than the normal bentonite. Prior art lost circulation materials describe cellulose-based particles where hydrogen bonds are being formed between the cellulose particles through water medium.

The third component may have adhesive nature towards the first and/or second component when applied in a drilling fluid. The modulus of elasticity in a tangential direction, $E_t$, of the third component may typically be less than $1/10$ of the modulus of elasticity in a longitudinal direction, $E_l$, and the modulus of elasticity in the radial direction, $E_r$, may typically be less than $1/5$ of $E_l$. Materials with such mechanical properties may form suitable anisotropic particles through a simple grinding process, since the dimensions which are less strong will be grinded more. Such materials may for example be organic or plant-based materials containing cellulose, typically wood. The longest dimension of the particles of the third component may for example be more than three times the shortest dimension of the particle in a direction perpendicular to the direction of the longest dimension. In this way, the particles of the third component will extent across a relatively long length within the film, thereby providing greater strength.

Preparation of the components may be performed in different ways to obtain special effects and reduce energy consumption in the process. For example, the materials may be processed with different grinding mills or hammers to create the desired size and shape, and thereby functionality, of the material. Heat treatment or roasting of the materials, either before or after grinding, may impact the components to achieve particular properties, and thereby performance, in a drilling fluid. Freeze-drying of the components before comminution may result in particles of a high quality. The original shape of the particles may be maintained, and no disadvantages of the freeze-drying process are found in the rehydrated particles. Freeze-drying may be particularly beneficial for the processing and preservation of natural fibre materials, and it may have the additional advantage that bacteria will not be transferred to the final composition.

The composition may for example comprise 15-99%, of the first component, for example 40-95%, and 1-30% of the second component, for example 5-25%. Such concentrations of the first and second components have been found to provide good film-forming properties when used in a drilling fluid. The composition may for example comprise up to 80% of third component, for example up to 40%.

When mixing the components of the invention into a drilling fluid, the rheology measurements obtained using an API standard method with equipment such as the Ofite 900 Viscometer may give misleading results. This may be due to the relative distance between the bob and sleeve being small in relation to the size of the components used in the present invention, thereby yielding incorrect readings. However, lab testing has shown that the particles of the present invention were not so large that the annular gap of the rheometer was plugged, however, an even larger annual gap might be yielding readings which better resemble the rheological properties of the fluid when being circulated in a well. Although potentially imprecise, the torque readings from a Heidolph Torquemaster mixer showed a reduction in torque when mixing a drilling fluid after addition of the present invention to a KCl Polymer drilling fluid. This is further evidence that a larger annular gap in the viscometer might provide more realistic rheology data. This may possibly be due to a roller bearing effect or lubricity effect.

A higher concentration of the components in the present invention may create higher viscosity readings in a viscometer but may still have a good lubricity or roller bearing effect when applied in a system where the fluid volumes or flow conditions replicate a typical well.

At least one of the first, second, and/or third component may be pre-treated before being mixed into a drilling fluid, such that they will have a specific property only upon meeting a desired condition. For example, the particles may be pre-treated such that they will only begin to adhere together when they experience the higher pressure in the well, for example above 350 bar. The mechanism may for example be to cover the particles with a shell, which will break and expose the untreated interior when the particles are subjected to a higher stress as a result of the higher pressure or higher differential pressure downhole. The particles will thereby not stick to equipment or the well wall in the upper portion of a well during drilling The particles may also contain a self-adhesive coated surface with a surface charge which allows the particles to bind to each other without a differential pressure difference. The particles may have a wide particle size distribution, which may allow a drilling fluid to form a continuous film on the surface, whereby the pore pressure transmission is very limited.

The use of particles which comprise natural plant fibres such as cellulose as a first component may be advantageous as a bridging agent compared to the use of e.g. calcium carbonate as bridging agent. Calcium carbonate is normally a relatively brittle and non-compressible inorganic mineral, so as a result it will often break down during circulation in a well. The sizes and size distribution of the calcium carbonate particles may therefore become smaller, whereby the particles will not be able to create a seal and withstand high pressure. However, as fibres such as cellulose fibres may be flexible, highly compressible, slightly swellable, and partially extrudable, materials comprising such fibres may form a quick sealing membrane to minimise the penetration of solids into the formation. Micronized fibres comprising cellulose can therefore effectively form seals at much lower concentration than the commonly used inorganic seepage loss additive. The toughness of materials containing cellulose may improve the ability of the particles to retain the original particle size and may reduce mechanical wear and degradation as would be experienced with more brittle materials.

Particles comprising cellulose may naturally absorb water and swell if the particles are exposed to water in a drilling fluid. The presence of water may neutralise the small positive and negative charges of the cellulose, allowing the particles to get entangled or interlocked. Upon application as a non-invasive fluid product, the particles of the first, second, or third component may be squeezed together due to the differential pressures around the wall of the wellbore. During this process, water may be squeezed out, and a strong film may be produced by the entangled or interlocked particles. Upon removal of the water, hydrogen bridges or other types of bonds such as covalent bonds, van der Waal bonds or other bonds may be formed between the particles, which strengthens the film further.

The composition may also be used in combination with clays. Both clays, cellulose, and natural polymers may have small natural positive and negative charges that create a high affinity to bind with water molecules due to their dipole nature. Such small negative and positive charges may create a bond with drilled cuttings or clay present in the drilling fluid. This further creates a benefit where the particles of the composition according to the invention can trap fine low-gravity solids and remove them through a piggyback mechanism, whereby an API 100 mesh screen is more than enough for filtering out solids. Since the particles may eliminate or reduce the need for finer screens, the conductivity with API 100 is greatly increased as compared to an API 170 or 200 screen. These are widely used for seepage loss control in almost every type of drilling fluid system. Naturally cellulose fibres may exhibit a highly polar surface due to the presence of hydroxyl groups. The high polarity of the cellulose fibre surface is the reason for their hydrophilic behaviour which may induce fibre swelling. To increase interfacial bonding between cellulose fibres further, surface treatment may be applied to fibres which improves their properties. Even with the small particle size as described in the examples, we see that the system can seal fractures of 0.5 mm or 1 mm when applied in the right concentrations. The treatment of the particles may be through exposure to high or low temperatures, mechanical comminution treatment such as hammering, cutting, or grinding, or through chemical treatment. The surface of the particles according to the invention may for technical applications be characterized by their zeta potential. For example, the maximum zeta potential of a fibre surface, which generally occurs in the alkaline range, indicates their hydrophilic or hydrophobic behaviour. There is a linear relation between the change in zeta potential and the water uptake capability in natural fibres due to acidic surface groups.

The composition of the present invention may be combined with prior art materials for creating a non-invasive fluid, prior art lost circulation material, or cementing materials. The composition may be especially useful against the instability encountered whilst drilling depleted reservoirs, pressured coal, and when entering normally pressured permeable formations in the presence of highly pressured formations in the same drilling sequence. The charged elements that may be a part of the materials of the present invention may use the behaviour and characteristics of clay to form a final seal across the pore throats, fractures, or filter cake. In effect, the particle size distribution which may result in using the finely dispersed clays may be far more impervious than any conventional material which is known by the applicant to be available today. The resultant membrane formed across permeable zones may prevent further invasion of mud and fluids into these zones. Physical penetration of the membrane can be measured in fractions of a millimetre, and fluid invasion or spurt loss is typically less than 20 mm. Bridging material comprising cellulose has proven to be resilient in sealing, and less affected by recirculation and pressure differentials in the wellbore due to the flexible nature of the cellulose.

The components may be treated with a natural seed oil to provide said components with an antibacterial effect.

Tests of the composition in concentrations of 4-10 lbs/bbl in a drilling fluid have shown that the invention is effective of creating a film and sealing fractures and permeable formations where the permeability may be in the range of 10 mDarcy to 150 Darcy.

The composition may also be combined with coarser materials, flakes, particles or fibres where the particle sizes of the additional components may be of size of e.g. 0-1000 μm or in a range of 0-10000 μm, or another coarser particle range, where the coarser particles may create a bridge in a larger aperture fracture and where the present invention acts to create a fine sealing or film towards the bridging-network of the coarser components.

The first and third components may be created through the processing of materials such as e.g. those included in the below list to achieve the required mechanical and chemical properties as described for each of said component, and of their combined properties.

The following biological or biogenic materials may likely be suitable as a first or third component:
  Shells, husks and hulls such as e.g. nut shells of almond, cashew, cocoa, coconut, coffee, oat, peanut, pecan, rice, seashells, or walnut
  Fruits, bark, beans, peels, pods and seeds such as e.g. banana, beans, caroub, neem, orange, or peas,
  Wood and stems such as e.g. beech, corn cob, oak, pine, spruce, or sycamore.

In a second aspect, the invention relates to a non-invasive drilling fluid comprising the composition according to the first aspect of the invention. The non-invasive drilling fluid may be a drill-in fluid, for example a solids-free drill in fluid, which is typically used for drilling the reservoir section of the wellbore. The non-invasive drilling fluid may be oil-, water-, or synthetic-based drilling fluid, and it can be either weighted or unweighted fluid.

In a third aspect, the invention relates to a method for drilling a wellbore, wherein the method comprises the step of using the non-invasive drilling fluid according to the second aspect of the invention when drilling at least a portion of the wellbore. The portion may typically be the reservoir portion. Since the film produced by the drilling fluid comprising the composition is generally covering the openings of the pores instead of blocking them, the film may easily be lifted off when the pressure on the drilling fluid is released. When drilling in a reservoir portion, the pressure in the reservoir may contribute to the removal of the film, and the permeability of the reservoir portion is thereby maintained. The method may additionally comprise the step of treating the portion of the wellbore with a liquid comprising sodium hypochlorite. In case portions of film are not fully removed, this treatment may cause all or most of these portions to be dissolved or dispersed again. The concentration of sodium hypochlorite may for example be around 5 wt %. The portion may for example be the reservoir portion. If small portions of film are still blocking portions of the portion, the step of treating the portion of the wellbore with a liquid comprising sodium hypochlorite may be followed by a step of treating the portion of the wellbore with a solution of hydrochloric acid. In this may even more of any film remaining film portions may be dissolved or dispersed, which is particularly beneficial for the reservoir portion of the wellbore, since the permeability may be maintained. The concentration of hydrogen chloride in the hydrochloride acid may for example be around 16 wt %.

BRIEF DESCRIPTION OF THE DRAWINGS

In the following is described aspects of the invention illustrated in the accompanying drawings, wherein.

DETAILED DESCRIPTION OF THE DRAWINGS

Figure 1A:
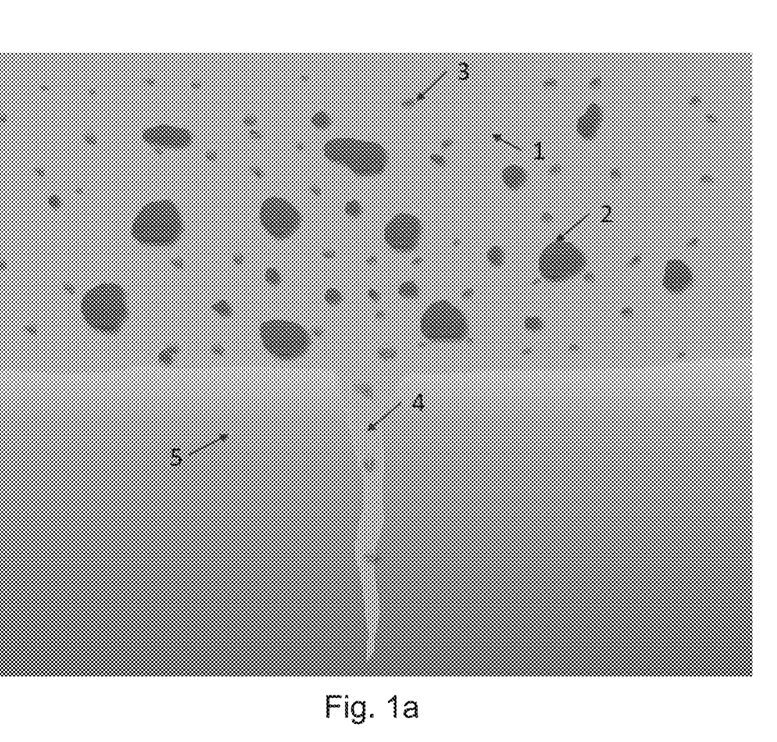
FIG. 1a shows the composition of a typical prior art non-invasive drilling fluid without a differential pressure is applied.
Figure 1B:
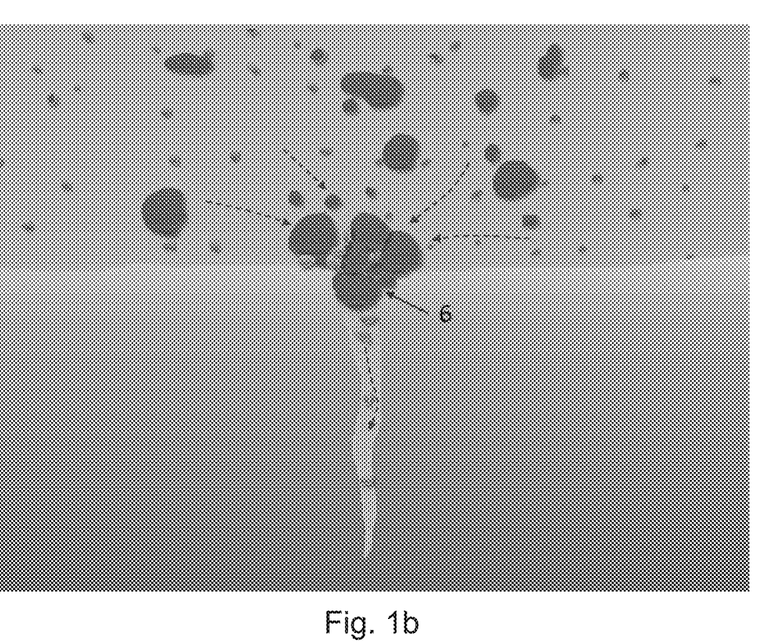
FIG. 1b shows the sealing mechanism of the prior art non-invasive drilling fluid of FIG. 1a after a differential pressure is applied.

FIG. 1a and 1b demonstrate the sealing mechanism of a typical prior art non-invasive drilling fluid 1 comprising a bridging agent 2 and additional solid particles 3 from the drilling fluid. The bridging agent 2 and solid particles 3 enter a fracture 4 in a well wall 5 and forms a relatively tight seal 6 (shown in FIG. 1b) in the opening of the fracture 4. Some solid particles 3 enters the fracture 4. The solid particles 3 may cause additional blocking of the fracture 4, which may be undesirable in e.g. a production zone of a well.

Figure 2A:
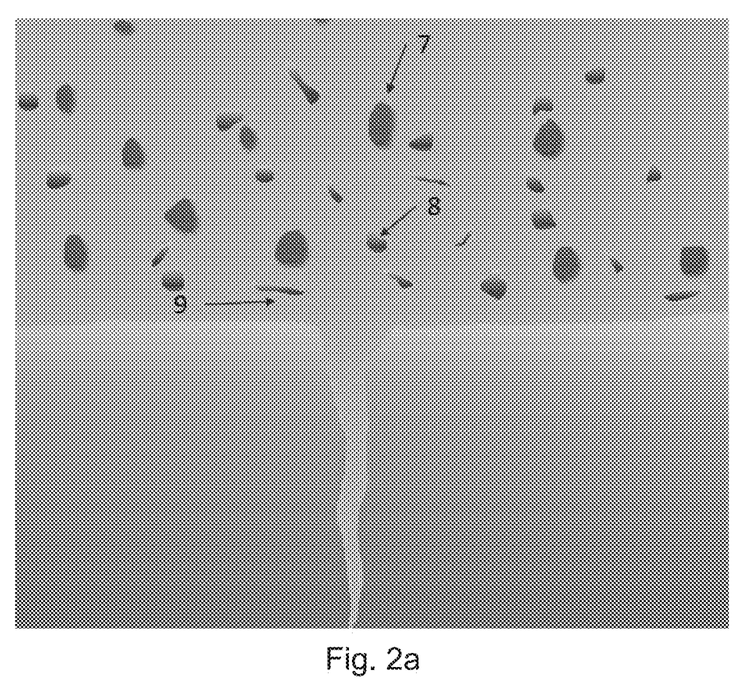
FIG. 2a shows the composition of an embodiment of the invention dispersed in a drilling fluid before differential pressure is applied.
Figure 2B:
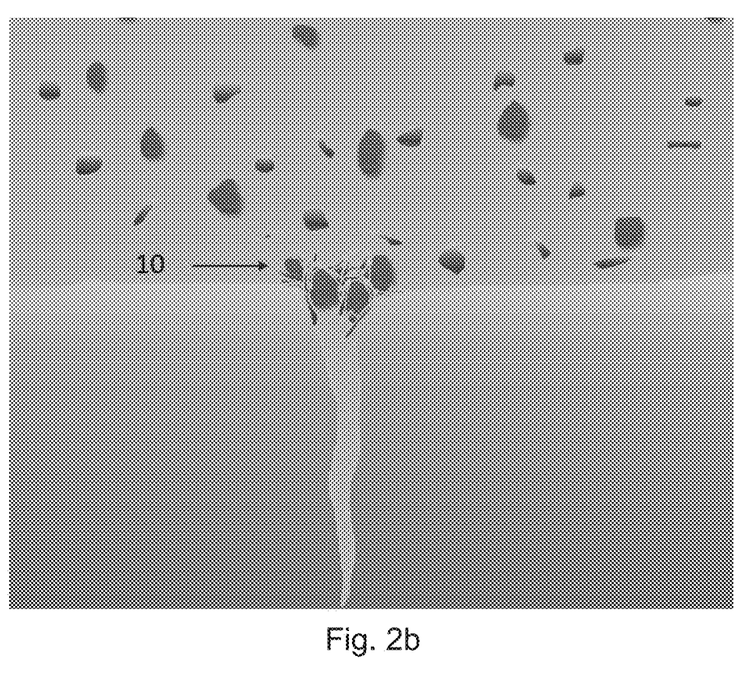
FIG. 2b shows the expected sealing mechanism of the drilling fluid of FIG. 2a after a differential pressure is applied.

FIGS. 2a, and 2b show the expected sealing mechanism of an embodiment of the composition according to the invention. The composition comprises particles of a first component 7, a second component 8, and a third component 9. The particles of the three components interlock to form a film 10 (shown in FIG. 2b) across the fracture 4. The particles of the first component 7 function as a bridging agent, the deformable particles of the second component 8 deform to seal the small holes, and the particles of the third component 9 interlock with the other particles of the drilling fluid provide strength and elasticity to the film 10. The resulting film 10 is thus fluid-tight, flexible and able to withstand much higher pressure than prior art non-invasive fluids. Also, the resulting film 10 may be created without the presence of drill solids or weighting materials.

In the following is described examples of preferred embodiments of the invention.

One way of mixing the components before adding it into the drilling fluid is to mix them in a ribbon blender. Another way of blending the components is air mixing. In the examples 1 to 3, a reference to e.g. 80 mesh shall be understood as the component being ground to a size that will pass through an 80 mesh dry sieve.

In the examples, water-based solid-free mud was prepared containing the following: soda ash, Caustic soda, xanthan gum, low viscosity polyanionic cellulose (PAC LV), KCl. The mud was mixed for 1 hr and kept aside.

EXAMPLE 1

Non-invasive drill-in fluid composition 1, wherein the components are ground, dried and sieved as follows are added to the water-based fluid:

Almond shell dust (100 mesh): 75% (component one)
Tamarind seed dust (100 mesh): 25% (component two)

EXAMPLE 2

Non-invasive drill-in fluid compositions 2, wherein the components are ground, dried and sieved as follows are added to the water-based fluid:

Almond shell dust (100 mesh): 75% (component one)
Tamarind seed dust (100 mesh): 5% (component two)
Coffee husk (120mesh): 20% (component three)

EXAMPLE 3

Non-invasive drill-in fluid composition 3, wherein the components are ground, dried and sieved as follows are added to the water-based fluid:

Almond shell dust (100 mesh): 90% (component one)
Tamarind seed dust (100 mesh): 10% (component two)

TABLE 1 important properties of the drilling fluids from example 1 to 3.
BHR is before hot rolling, and AHR is after hot rolling.

Date: 16 Oct. 2019
Solid Free WBM (8.6 ppg)
Measured parameters @ 49° C.
8 ppb NIF

|  | Example 1 | | Example 2 | | Example 3 | |
| --- | --- | --- | --- | --- | --- | --- |
|  | BHR | AHR @ 90° C., 16 Hrs | BHR | AHR @ 90° C., 16 Hrs | BHR | AHR @ 90° C., 16 Hrs |
| 600 rpm | 41.3 | 55.5 | 42.3 | 35 | 37.7 | 50.8 |
| 300 rpm | 31 | 42.2 | 31.6 | 28.2 | 28.8 | 39.5 |
| 6 rpm | 7 | 8.5 | 8 | 5 | 6.7 | 9.1 |
| 3 rpm | 5.3 | 6.7 | 6 | 4 | 5.2 | 7.2 |
| Plastic Viscosity, cP | 10.3 | 13.3 | 10.7 | 68 | 8.9 | 11.3 |
| Yield Point, lb/100 ft2 | 20.7 | 28.9 | 20.9 | 21.4 | 19.9 | 28.2 |
| pH | 8.5 | 9.42 | 9.8 | 9.6 | 8.48 | 9.38 |
| API Filtration loss (gram) | 6.55 | 6.16 | 6.71 | 6.85 | 7.08 | 6.16 |
| Invasion-100 psi (mm), 38/40 mesh sand | 36.6 | 27 | 43 | NC | NC | 30 |

Comment: For 100 psi, NC = 60 mm

EXAMPLE 4

Seepage Loss and Rheology Test

A sand bed test was conducted to establish a relative measure of seepage loss of a base fluid with different test additives, Additive A (a composition according to present invention) and Additive B (Registered trademark FEBRI-COAT®). Reference is the mud without any additive, Additive A in concentration of 10 lbs/bbl (pounds per barrel) is a composition according to our present invention, Additive B in concentration of 10 lbs/bbl is a NIF for normal drilling, and NC is no control.

The water-based solid-free mud was prepared as described above. A filter press cylinder was filled with 20/40 mesh fraction sand up to 45 mm. The cell was topped with 118 g of mud to be tested, the lid was closed, and 100 psi was applied slowly. Filtrate invaded the sand for a short period of time and then completely ceased leaving the bottom section of the sand bed dry. The depth of invasion was recorded in mm, and the results are given in Table 2.

Another set of tests was done by using Water-based Bentonite mud. These results are given in Table 3.

TABLE 2

Performance test in solid-free mud

| Measure parameters | Reference | Additive A (10 lbs/bbl) | Additive B (10 lbs/bbl) |
| --- | --- | --- | --- |
| PV, cp | 15 | 20 | 15 |
| YP, lb/100 ft2 | 17 | 21 | 20 |
| Invasion length @ 100 psi, mm | NC | 26 | NC |
| Invasion length @ 500 psi, mm | NC | 62 | NC |
| API Filtration loss, (mL) | 35 | 9 | 11 |
| HPHT Filtration loss at 500 psi and 90° C. | 40 | 16.4 | 18.8 |

TABLE 3

Performance test in 8.7 ppg (pounds per gallon) bentonite mud

| Measure parameters | Reference | Additive A (10 lbs/bbl) | Additive B (10 lbs/bbl) |
| --- | --- | --- | --- |
| PV, cp | 15 | 21 | 18 |
| YP, lb/100 ft2 | 20 | 22 | 22 |
| Invasion length @ 100 psi, mm | NC | 19 | 30 |
| Invasion length @ 500 psi, mm | NC | 58 | 64 |
| API Filtration loss, (mL) | 11 | 4.5 | 5.2 |
| HPHT Filtration loss at 500 psi and 90° C. | 29 | 14.2 | 16.0 |

EXAMPLE 5

Acid Degradability

Acid solubility was tested on two additives (Additive A and Additive B). Acid solubility was tested by placing the test additives in 16% HCl and 16% HCl+5% $Na_2S_2O_8$ solution and heated at 90° C. for 8 hrs. The test additives were filtered, and solids collected on the filter paper were weighed. % of solubility was measured.

TABLE 4

% of solubility

| Test additive | % of solubility in 16% HCl | % of solubility in 16% HCl + 5% $NA_2S_2O_8$ |
| --- | --- | --- |
| Additive A | 78% | 86% |
| Additive B | 48% | 50% |

EXAMPLE 6

Complete Solubility is Achieved by Dual Treatment: Treating with 5% NaOCl Solution for 3 Hours at 90° C. Followed by 16% HCl Solution for 3 Hours at 90° C.

TABLE 5

| Test additive | wt % of solubility in 5% NaOCl followed by 16% HCl |
|---|---|
| Additive A | 97% |
| Additive B | 65% |

% of solubility

The example shows that a drilling fluid comprising Additive A can seal the sand bed without the presence of drilled solids or other solids such as e.g. bentonite in the mud. This will enable drilling of a reservoir, e.g. containing hydrocarbons, without allowing a significant amount of drilled solids or other solids to enter the formation, which would likely reduce the natural permeability of the reservoir after drilling is completed. Additionally, the documented solubility of the film will allow the film to be removed by reverse pressure or by solubilization before production.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The invention claimed is:

1. A method of drilling a wellbore, the method comprising pumping a drilling fluid into the wellbore during drilling of the wellbore, the drilling fluid comprising a composition having a first component comprising particles having a scratch hardness above 2 Mohs and a second component comprising particles of comminuted whole seeds, with their testa, of *Tamarindus indica*, wherein the second component comprises comminuted components from the testa and kernel of the whole *Tamarindus indica* seeds in about the same proportions as those components are found in the whole *Tamarindus indica* seeds prior to being comminuted, the composition being configured to form an impermeable film on a surface of the wellbore and thereby substantially prevent fluid loss through porous portions of the wellbore.

2. The method according to claim 1, further comprising removing the impermeable film after drilling of the wellbore is complete by applying a fluid pressure in the wellbore which is lower than the fluid pressure in a production zone associated with the wellbore, and/or a breaker solution, and/or an acid on the surface of the wellbore.

3. The method according to claim 1, further comprising removing the impermeable film from the surface of the wellbore by reducing pressure on the drilling fluid after drilling of the wellbore is completed, so that fluid pressure in the wellbore is lower than fluid pressure in a production zone associated the wellbore.

4. The method according to claim 1, further comprising treating the impermeable film to a desired degree of solubilization.

5. The method according to claim 1, further comprising treating the impermeable film with at least one of NaOCl and HCl.

6. The method according to claim 1, further comprising preparing the particles of the first component and/or the particles of the second component by grinding, crushing, heating, and/or freeze-drying.

7. The method according to claim 1, further comprising covering the particles of the first component and/or the second component with a shell that will break and expose an untreated interior when the particles of the first component and/or the second component are subjected to a predetermined pressure.

8. The method according to claim 1, further comprising treating the first component and the second component with a natural seed oil to provide an antibacterial effect.

9. The method according to claim 1, further comprising adding more of the composition to the drilling fluid while drilling of the wellbore to thereby maintain a desired concentration of the composition and maintain film-making properties of the drilling fluid.

10. The method according to claim 1, further comprising subsequently replacing the drilling fluid with a non-invasive drilling fluid.

11. The method according to claim 1, further comprising providing the composition with a third component having an anisotropic mechanical property that facilitates elastic deformation and strengthens the impermeable film.

12. The method according to claim 11, wherein the third component is configured to make the impermeable film more flexible to differential pressure.

13. The method according to claim 11, wherein the first component, the second component, and the third component are biodegradable or biogenic.

14. The method according to claim 11, wherein a majority of at least one of the first component and the third component comprises cellulose.

15. The method according to claim 11, wherein a longest dimension of the particles of the third component is more than three times a shortest dimension of the particles of the third component in a direction perpendicular to the longest dimension.

16. The method according to claim 1, wherein a total concentration of the first component and the second component is less than 30 pounds per barrel, corresponding to 85.5 kg/m$^3$.

17. The method according to claim 1, wherein a total concentration of the first component and the second component is in a range of 4-10 pounds per barrel, corresponding to 11.4-28.5 kg/m$^3$.

18. The method according to claim 1, wherein the composition has a concentration of 4-10 pounds per barrel (ppb) for preventative treatment of losses of the drilling fluid against a permeable or fractured formation.

19. The method according to claim 1, wherein the drilling fluid comprises an oil-, water-, or synthetic-based drilling fluid.

* * * * *